(12) United States Patent
Yang et al.

(10) Patent No.: US 9,183,639 B2
(45) Date of Patent: Nov. 10, 2015

(54) IMAGE FRAME PROCESSING INCLUDING USAGE OF ACCELERATION DATA IN ASSISTING OBJECT LOCATION

(71) Applicant: INTEL CORPORATION, Santa Clara, CA (US)

(72) Inventors: Liu Yang, Beijing (CN); Xianchao Xu, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 50 days.

(21) Appl. No.: 14/125,560

(22) PCT Filed: Sep. 26, 2013

(86) PCT No.: PCT/CN2013/084321
§ 371 (c)(1),
(2) Date: Dec. 11, 2013

(87) PCT Pub. No.: WO2015/042828
PCT Pub. Date: Apr. 2, 2015

(65) Prior Publication Data
US 2015/0086073 A1    Mar. 26, 2015

(51) Int. Cl.
*G06K 9/00* (2006.01)
*G06T 7/20* (2006.01)

(52) U.S. Cl.
CPC ..... *G06T 7/2033* (2013.01); *G06T 2207/10016* (2013.01); *G06T 2207/30241* (2013.01)

(58) Field of Classification Search
None
See application file for complete search history.

(56) References Cited

U.S. PATENT DOCUMENTS

2003/0099375 A1    5/2003    Sefcik
2007/0165907 A1    7/2007    Schroeder et al.
2009/0128647 A1*   5/2009    Fahn et al. ............... 348/221.1

FOREIGN PATENT DOCUMENTS

CN    102461150 A         5/2012
KR    20030073447 A       9/2003
KR    20120025290 A   *   3/2012

OTHER PUBLICATIONS

International Search Report and Written Opinion mailed May 21, 2014 for International Application No. PCT/CN2013/084321, 12 pages.

* cited by examiner

*Primary Examiner* — John Strege
*Assistant Examiner* — Feng Niu
(74) *Attorney, Agent, or Firm* — Schwabe, Williamson & Wyatt, P.C.

(57) ABSTRACT

Apparatuses, methods and storage medium associated with computing, including processing of image frames, are disclosed herein. In embodiments, an apparatus may include an accelerometer and an image processing engine having an object tracking function. The object tracking function may be arranged to track an object from one image frame to another image frame. The object tracking function may use acceleration data output by the accelerometer to assist in locating the object in an image frame. Other embodiments may be described and claimed.

21 Claims, 6 Drawing Sheets

IMAGE FRAME PROCESSING INCLUDING USAGE OF ACCELERATION DATA IN ASSISTING OBJECT LOCATION

CROSS REFERENCE TO RELATED APPLICATIONS

The present application is a national phase entry under 35 U.S.C. §371 of International Application No. PCT/CN2013/084321, filed Sep. 26, 2013, entitled "IMAGE FRAME PROCESSING INCLUDING USAGE OF ACCELERATION DATA IN ASSISTING OBJECT LOCATION", which designated, among the various States, the United States of America. The Specification of the PCT/CN2013/084321 Application is hereby incorporated by reference.

TECHNICAL FIELD

The present disclosure relates to the field of computing, in particular, to apparatuses, methods and storage medium associated with processing a plurality of image frames including usage of acceleration data in assisting locating objects in the image frames.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

The objective of video tracking is to locate a moving object in consecutive video frames. Both the movement of the object and the movement of the video camera can make the imaged object move in the video frame. The tracking requirement of a large number of vision applications can be categorized as tracking in the video stream an object caught by a moving camera in a static scene. For example, in an example scenario of augmented reality, a man with a video camera may point at a static picture having an angry bird in it. The augmented reality module on the device (e.g., a smartphone or a computing tablet) may detect the bird and its sword; then the augmented reality module may overlap a fighting samurai girl upon the detected area. In this example, only the motion of the camera causes the movement of the imaged angry bird. Other examples may include faces of the audience in a meeting room, or an ant crawling on a wall. In these scenes, the impact to the imaging position applied by movement of the object itself is negligible compared to the movement of the video camera.

In a typical prior art method, an object may be located in an image frame by first identifying a target object area in a current image frame, based on the fore knowledge learned in a prior image frame. Thereafter, a search for the object may be launched, moving a search window around a neighborhood encompassing the target object area. However, these kinds of neighborhood search tend to be non-trivial, requiring non-trivial amount of computations and power.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with computing, including processing of image frames, are disclosed herein. In embodiments, an apparatus (e.g., a smartphone or a computing tablet) may include an accelerometer and an image processing engine having an object tracking function. The object tracking function may be arranged to track an object from one image frame to another image frame. The object tracking function may use acceleration data output by the accelerometer to assist in locating the object in an image frame. Resultantly, location of an object in an image frame may be accomplished more efficiently, potentially consuming less computing resources and energy.

These and other aspects will be further described in more detail below, with references to the accompanying drawings which form a part hereof. Like numerals in the drawings designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The term "closed captions" is to include traditional closed captions and/or subtitles.

Figure 1:
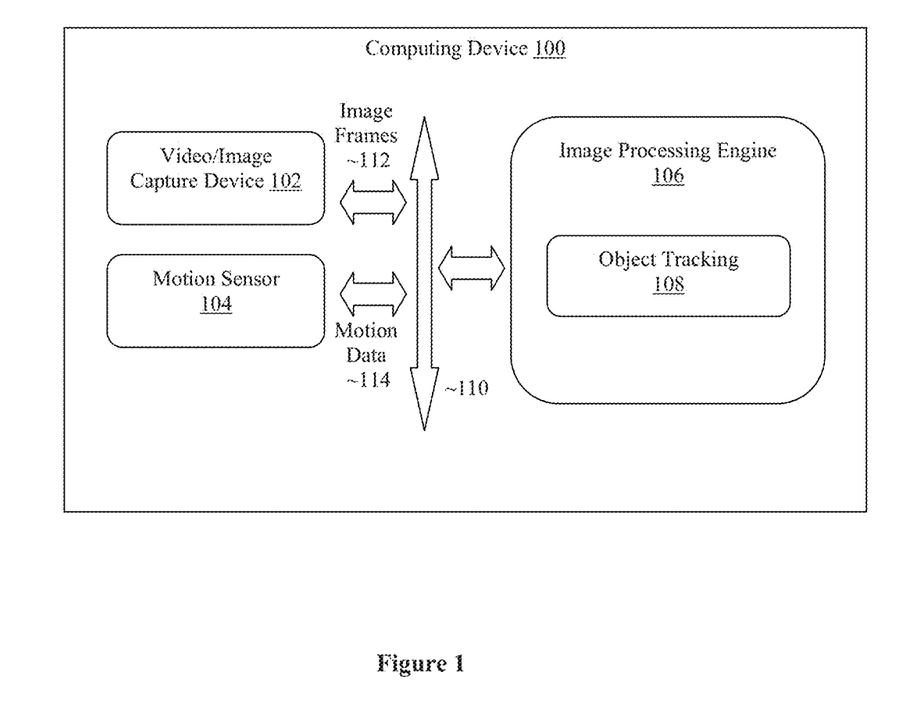
FIG. 1 illustrates a component view of a computing device incorporated with the teachings of the present disclosure, in accordance with various embodiments.

Referring now FIG. 1, a component view of a computing device incorporated with the teachings of the present disclosure is shown, in accordance with various embodiments. As illustrated, in embodiments, computing device 100 may include video/image capture device 102, motion sensor 104, and image processing engine 106, coupled with each other, via interconnect 110. Video/image capture device 102 may be configured to capture and generate video having a plurality of video frames (also referred to as image frames) 112. By virtue of being disposed on computing device 100, video/image capture device 102 may tend to experience the same motion, including acceleration, experienced by computing device 100. Motion sensor 104, being also disposed on computing device 100, may be configured to sense motion of computing device 100, and output motion data 114. Motion data 114 may include or enable derivation of acceleration data that indicate an amount of acceleration being experienced by computing device 100 (including its components, such as, video/image capture device 102).

Image processing engine 106 may be configured to process image frames 112. In embodiments, image processing engine 106 may include object tracking function 108. Object tracking function 108 may be configured to track an object from one image frame to another image frame. Typically, computing device 100 (including video/image capture device 102) may be in transition between one or three states: static, burst motion, and non-regular movement. Computing device 100 (including video/image capture device 102), in general, is seldom in a state of constant speed movement. In the static state, no motion or acceleration will be experienced. However, in the other two states, video/image capture device 102 will tend to experience the same acceleration experienced by computing device 100. Accordingly, object tracking function 108 may be configured to advantageously use motion data 114 to assist it in locating an object in an image frame 112. Resultantly, less computation may be required to locate an object in an image frame 112, and thereby potentially consuming less computing resource and/or power/energy. These and other aspects will be further described in more detail below.

Video/image capture device 102 may be any one of a number of video/image capture devices known in the art including, but are not limited to, complementary metal oxide (CMOS) based pixel image sensors of various pixel capacities. Examples of CMOS cameras may include, but are not limited to, CMOS cameras available from Samsung, Inc., of Seoul, Korea, or CMOS cameras available from Aptina Imaging, of San Jose, Calif.

Motion sensors 104 may be any one of a number of motion sensors known in the art, including, but are not limited to, accelerometers. Accelerometers, when employed, may be any one of a number of accelerometers known in the art, including, but are not limited to bulk micromachined capacitive accelerometers, bulk micromachined piezoelectric resistive accelerometers, capacitive spring mass based accelerometers, DC response based accelerometers, electromechanical servo accelerometers, and so forth.

Except for object tracking function 106, image processing engine 104 is intended to represent a broad range of such element known in the art. Image processing engine 104, in general, may be configured to enhance, restore, compress, or decompress object frames. Object tracking function 106 will be further described later with references to FIGS. 2-4. Image processing engine 104, including object tracking function 106, may be implemented in hardware and/or software. Hardware embodiments may be implemented, e.g., in Application Specific Integrated Circuits (ASIC), or programmable logic devices, such as field programmable gate arrays (FPGA). Hardware/software embodiments may include one or more general purpose and/or graphical processors, memory and various other peripheral resources. The processing logic may be implemented in native instructions of the processors or in higher level languages with compiler support that can compile the high level language instructions into native instructions of the instruction set architecture (ISA) of the underlying processors.

In FIG. 1, video/image capture device 102, motion sensor 104 and image processing engine 106, for ease of understanding, are shown as coupled via interconnect 110. Interconnect 110 may include one or more interconnected control and/or data buses. Control/data buses may be any one of a number of buses known in the art, including, but are not limited to, the $I^2C$ bus, the universal serial bus (USB), the peripheral control interconnect (PCI) bus, or other buses of the like.

In embodiments, computing device 100 may include more or less components. For example, video/image capture device 102 and motion sensor 104 may be jointly disposed outside of computing device 100. For these embodiments, image frames 112 and motion data 114 may be provided to computing device 100 via a communication/networking interface. The communication/networking interface may be any one of a number of personal network, local area network, wide area network, wired or wireless, communication/networking interface, including, but are not limited to, near field communication (NFC), Bluetooth®, Ethernet, WiFi, WiMax, 3G/4G/5G communication/networking interfaces.

Thus, computing device 100, except for the teachings of the present disclosure, may be any one of a broad range of computing devices known in the art, including, but are not limited to, smartphones, computing tablets, netbooks, laptop computers, e-readers, cameras, and so forth.

Figure 2:
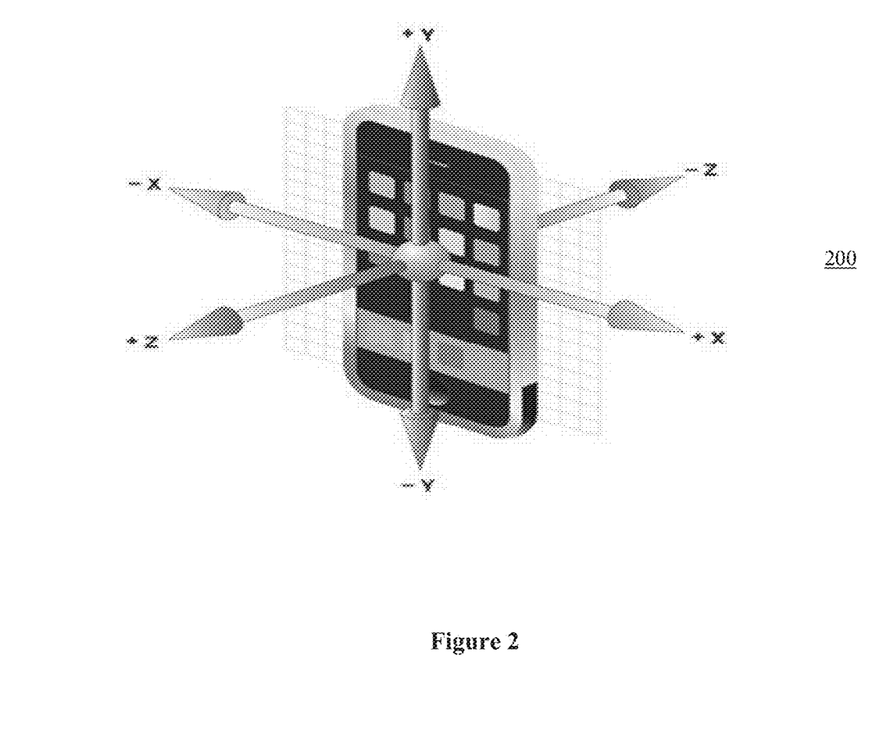
FIG. 2 illustrates movement of the computing device in free space, in accordance with various embodiments.

Referring now to FIG. 2, wherein movement of the computing device in free space, in accordance with various embodiments, is illustrated. As shown, movement of computing device 100 may be measured and expressed with reference to the X-Y-Z coordinate system 200. In particular, acceleration of computing device 100, may be represented by an acceleration vector $\overrightarrow{G(x,y,z)}$, with reference to the illustrated X-Y-Z coordinate system 200. The amount of acceleration may be determined by computing the magnitude of $\overrightarrow{G(x,y,z)}$, which may be denoted as $\|\vec{G}\|$. In embodiments, the amount of acceleration may be approximated using the magnitude of the planar vector $\overrightarrow{G(x,y,z)}$, which may be denoted as $\|\vec{G}\|$.

Figure 3:
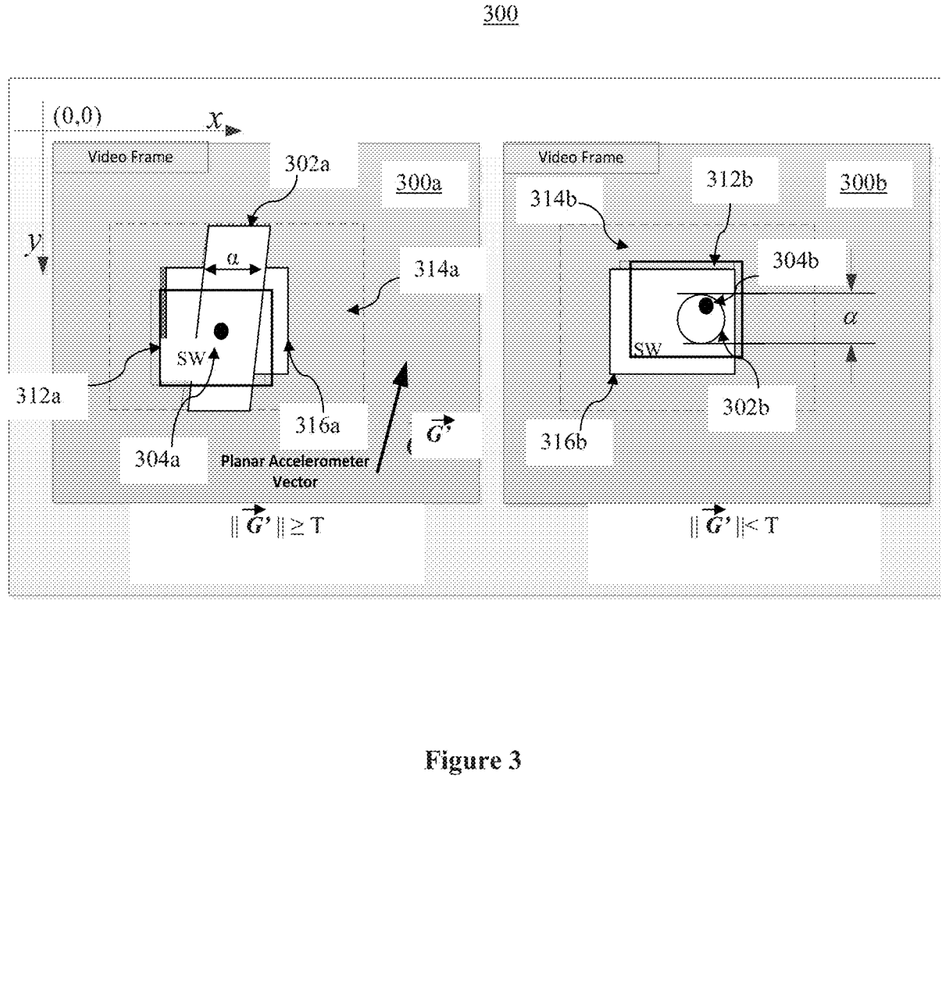
FIG. 3 illustrates a strategy for locating an object in an image frame, in accordance with various embodiments.

Referring now to FIG. 3, wherein a strategy for locating an object in an image frame, in accordance with various embodiments, is illustrated. As shown, strategy 300 may include two parts 300a and 300b. In embodiments, strategy 300a may be employed if $\|\vec{G}\|$ is great than or equal to a threshold value, while strategy 300b may be employed if $\|\vec{G}\|$ is less than a threshold value. The threshold value may vary from application to application, depending on the level of precision desired. It may be empirically determined.

When employed, under strategy 300a, object tracking function 108 may attempt to locate an object in an image frame by searching quadrilateral area 302a. In embodiments, quadrilateral area 302a may be a parallelogram having center 304a, a height, and width α. Center 304a and the height may be the same as the center and the height of neighborhood 314a for object target area 316a, under a prior art neighborhood search approach. Width α will be further described later. Object tracking function 108 may first search a portion of quadrilateral area 302a that spans from center 304a towards an edge of quadrilateral area 302a opposite the direction of $\vec{G}$. On failure to locate the object, object tracking function 108 may further search the remaining portion of quadrilateral area 302a that spans from center 304a towards an edge of quadrilateral area 302a along the direction of $\vec{G}$. As can be seen from FIG. 3, search of quadrilateral area 302a covers a much smaller area than searching neighborhood 314a of object target area 316a, using search window 312a, under the prior art neighborhood approach.

When employed, under strategy 300b, object tracking function 108 may attempt to locate an object in an image frame by searching circular area 302b. Similar to quadrilateral area 302a, circular area 302b may have a center 304b and diameter β. Center 304b may also be the same as the center of neighborhood 314b for object target area 316b, under a prior art neighborhood search approach. Diameter β will be further described later. Like strategy 300a, search of circular area 302b also covers a much smaller area than searching neighborhood 314b of object target area 316b, using search window 312b, under the prior art neighborhood approach.

In embodiments, width α may be determined based at least in part on the amount of acceleration and a frame rate of image frames 300a/300b. More specifically, width α may be determined as follows:

$$\alpha \leq 2s = \|\vec{G}\|(1/q)^2$$

where s is the movement of the center of the target object in the horizontal direction, $\|\vec{G}\|$ is the amount of acceleration denoted by the magnitude of acceleration vector G(x, y), and q is the frame rate.

In the real time application, q is typically larger than 30, thus $$\alpha = \|\vec{G}\|/900$$

which in turn may be translated into units of pixels, based on the pixel parameters of video/image capture device 102.

In embodiments, the above computations may be applied to determine diameter β In other words, diameter β may likewise be determined as follows:

$$\beta \leq 2s = \|\vec{G}\|(1/q)^2$$

where s is the movement of the center of the target object in the horizontal direction, $\|\vec{G}\|$ is the amount of acceleration denoted by the magnitude of acceleration vector $\overline{G(x,y,z)}$, and q is the frame rate In the real time application, q is typically larger than 30, thus $$\beta = \|\vec{G}\|/900$$

which in turn may be translated into units of pixels, based on the pixel parameters of video/image capture device 102.

Figure 4:
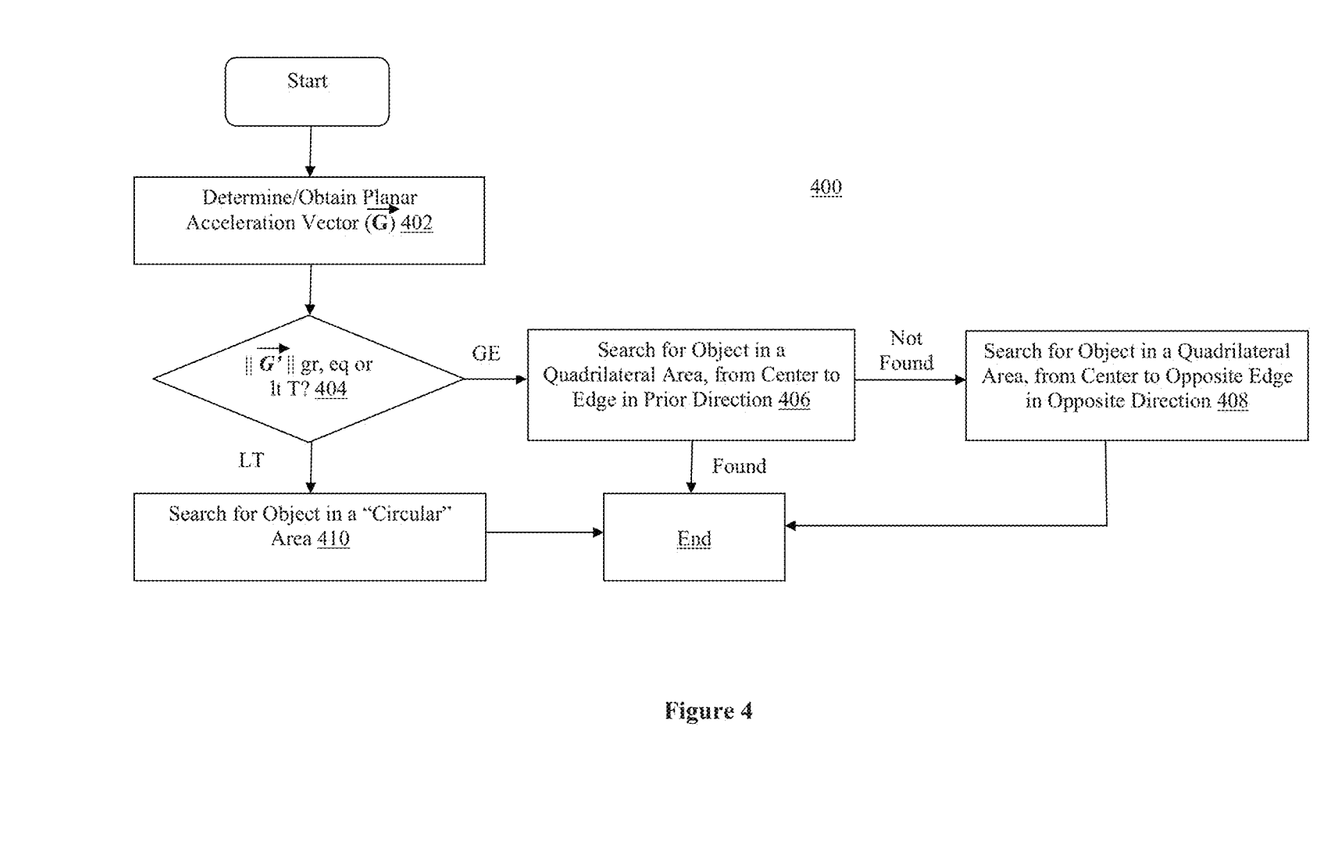
FIG. 4 illustrates a method for locating an object in an image frame, in accordance with various embodiments.

Referring now to FIG. 4, wherein a method for locating an object in an image frame, in accordance with various embodiments, is illustrated. As shown, method 400 may include operations performed at blocks 402-410. The operations may be performed, e.g., by object tracking function 118 of FIG. 1.

In embodiments, method 400 may start at block 402. At block 402, planar acceleration vector ($\vec{G}$) may be obtained/determined. From block 402, method may proceed to block 404. At block 404, a determination may be made with respect to whether the magnitude of $\vec{G}$, i.e., $\|\vec{G}\|$, is greater than, equal to or less than a threshold T.

On determination that $\|\vec{G}\|$, is greater than or equal to threshold T, method 400 may proceed to block 406 and 408, where the early described strategy of searching a quadrilateral area to locate the object may be performed. As earlier described, the quadrilateral area may be a parallelogram having a center, a height, and width α. The center and height may be the same as the center and the height of a neighborhood encompassing the object target area, under a prior art neighborhood search approach. Width α may be selected as earlier later. At block 406, a first search may be performed for a portion of quadrilateral area that spans from the center towards an edge of the quadrilateral area opposite the direction of $\vec{G}$. On locating the object, operations at block 408 may be skipped. However, on failure to locate the object, at block 408, a further search may be performed for the remaining portion of the quadrilateral area that spans from the center towards an edge of the quadrilateral area along the direction of $\vec{G}$ From block 404, on determining that $\|\vec{G}\|$, is less than threshold T, method 400 may proceed to block 410, where the early described strategy of searching circular area to locate the object may be performed. As described earlier, the circular area may have a center and diameter β. The center may also be the same as the center of the neighborhood encompassing object target area, under the prior art neighborhood search approach. Diameter β may be determined as earlier described.

At the end of the operations of block 406, 408, or 410, method 400 may terminate. In embodiments, method 400 may be repeated multiple times for locating multiple objects in an image frame, or locating an object in multiple number of image frames.

Figure 5:
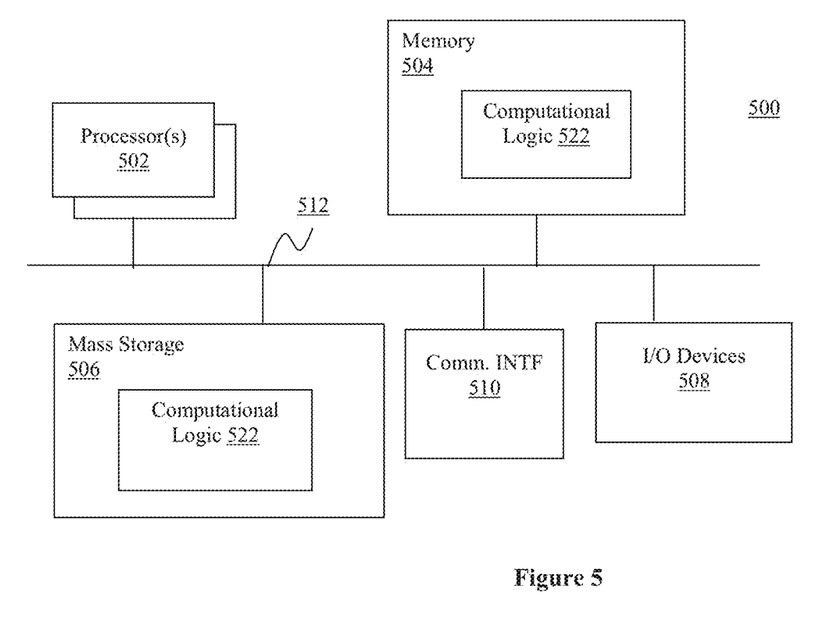
FIG. 5 illustrates an example computing system suitable for practicing the disclosure, in accordance with various embodiments.

Referring now to FIG. 5, wherein an example computer suitable for use for the arrangement of FIG. 1, in accordance with various embodiments, is illustrated. As shown, computer 500 may include one or more processors 502 and system memory 504. In embodiments, at least one of processors 502 includes multiple or processor cores on a die. Additionally, computer 500 may include mass storage devices 506 (such as diskette, hard drive, compact disc read only memory (CD-ROM) and so forth), input/output devices 508 (such as display, keyboard, cursor control and so forth) and communication interfaces 510 (such as network interface cards, modems and so forth). The elements may be coupled to each other via system bus 512, which may represent one or more buses. In the case of multiple buses, they may be bridged by one or more bus bridges (not shown).

Each of these elements may perform its conventional functions known in the art. System memory 504 and mass storage devices 506 may be employed to store a working copy and a permanent copy of the programming instructions implementing the operations associated with image processing engine 106, including object tracking function 108, as earlier described. The various elements may be implemented by assembler instructions supported by processor(s) 502 or high-level languages, such as, for example, C, that can be compiled into such instructions.

The permanent copy of the programming instructions may be placed into mass storage devices 506 in the factory, or in the field, through, for example, a distribution medium (not shown), such as a compact disc (CD), or through communication interface 510 (from a distribution server (not shown)). That is, one or more distribution media having an implementation of the agent program may be employed to distribute the agent and program various computing devices.

The number, capability and/or capacity of these elements 510-512 may vary, depending on the intended use of example computer 500, e.g., whether example computer 500 is a stationary computing device like a set-top box or a desktop computer, or a mobile computing device, like a smartphone, tablet, ultrabook or laptop. The constitutions of these elements 510-512 are otherwise known, and accordingly will not be further described.

Figure 6:
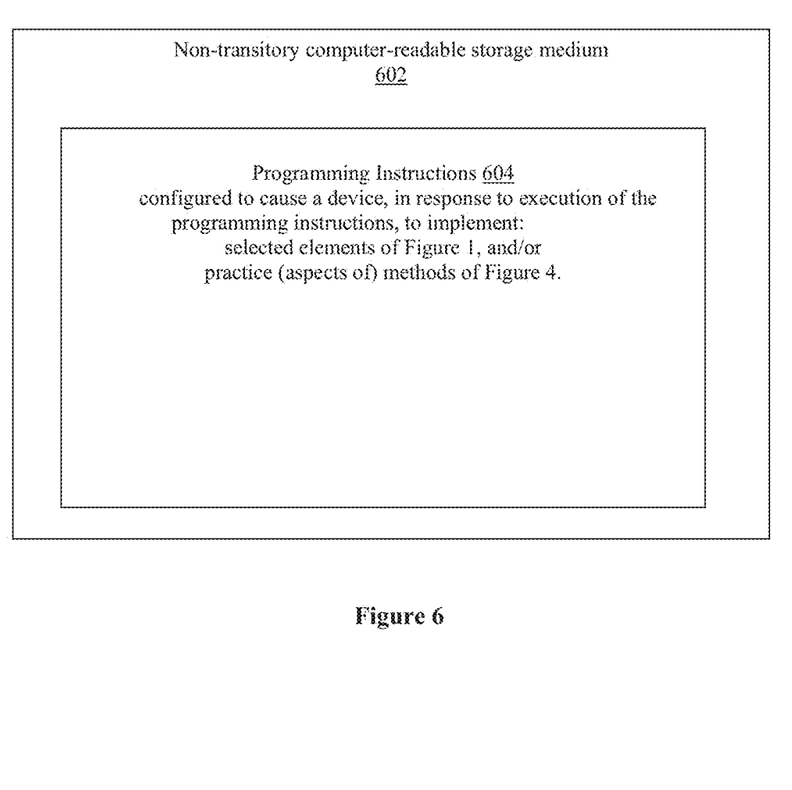
FIG. 6 illustrates an example storage medium with instructions configured to enable an apparatus to practice the present disclosure, in accordance with various embodiments.

FIG. 6 illustrates an example non-transitory computer-readable storage medium having instructions configured to practice all or selected ones of the operations associated with image processing engine 106, including object tracking function 108: in accordance with various embodiments. As illustrated, non-transitory computer-readable storage medium 602 may include a number of programming instructions 604. Programming instructions 604 may be configured to enable a device, e.g., computer 400, in response to execution of the programming instructions, to perform, e.g., various operations of methods 400 of FIG. 4, e.g., but not limited to, the operations performed by object tracking function 108. In alternate embodiments, programming instructions 604 may be disposed on multiple computer-readable non-transitory storage media 602 instead. In still other embodiments, programming instructions 604 may be encoded in computer-readable transitory storage media 602 instead, e.g., signals.

Referring back to FIG. 5, for one embodiment, at least one of processors 502 may be packaged together with computational logic 522 (in lieu of storing in memory 504 and/or mass storage 506) configured to practice aspects of method 400 of FIG. 4. For one embodiment, at least one of processors 502 may be packaged together with computational logic 522 configured to practice aspects of the method 400 of FIG. 4 to form a System in Package (SiP). For one embodiment, at least one of processors 502 may be integrated on the same die with computational logic 522 configured to practice aspects of method 400 of FIG. 4. For one embodiment, at least one of processors 502 may be packaged together with computational logic 522 configured to practice aspects of method 400 of FIG. 4 to form a System on Chip (SoC). For at least one embodiment, the SoC may be utilized in, e.g., but not limited to, a smartphone or a computing tablet.

Thus, example embodiments described include, but are not limited to:

Example 1 may be an apparatus for computing, including processing of image frames. The apparatus may include an accelerometer, and an image processing engine coupled with the accelerometer. The image processing engine may be arranged to process a plurality of image frames, wherein the image processing engine includes an object tracking function to track an object from one image frame to another image frame, and wherein the object tracking function uses acceleration data output by the accelerometer, or derived from data output by the accelerometer, to assist in locating the object in an image frame.

Example 2 may be example 1, wherein the object tracking function employs a different search strategy to locate the object in an image frame, depending on whether the acceleration data indicate an amount of acceleration greater than, equal to, or less than a threshold.

Example 3 may be example 2, wherein the object tracking function searches a quadrilateral area to locate the object in an image frame, on determination that the acceleration data indicate an amount of acceleration greater than or equal to a threshold.

Example 4 may be example 3, wherein the object tracking function first searches for the object in a portion of the quadrilateral area that spans from a center of the quadrilateral area to an edge of the quadrilateral area in a direction opposite to an acceleration direction indicated by the acceleration data.

Example 5 may be example 4, wherein the object tracking function, on failure to locate the object, further searches for the object in another portion of the quadrilateral area that spans from the center of the quadrilateral area to an edge of the quadrilateral area in the acceleration direction.

Example 6 may be example 3, 4, or 5, wherein the quadrilateral area has a shape of a parallelogram.

Example 7 may be example 6, wherein the parallelogram has a width determined based at least in part on the amount of acceleration, and a frame rate of the plurality of image frames.

Example 8 may be any one of examples 2-7, wherein the object tracking function searches a circular area to locate the object in an image frame, on determination that the acceleration data indicate an amount of acceleration less than a threshold.

Example 9 may be example 8, wherein the circular area has a diameter determined based at least in part on the amount of acceleration, and a frame rate of the plurality of image frames.

Example 10 may be any one of examples 1-9, further comprising an image capturing device coupled with the image processing engine, to generate the plurality of image frames.

Example 11 may be any one of examples 1-10, wherein the apparatus comprises a smartphone, a computing tablet, a laptop computer, a netbook, an e-reader, or a camera.

Example 12 may be a method for computing, including processing of image frames. The method may include processing, by a computing device, a plurality of image frames, including a first and a second of the image frames having an object. Processing the image frames may include tracking the object in the first and second image frames. Tracking the object in the first and second image frames may include locating the object in the second image frame. Locating the object in the second image frame may include using acceleration data that indicates acceleration of the computing device to assist in searching for the object in the second image frame.

Example 13 may be example 12, wherein locating the object comprises employing a different search strategy to locate the object in the second image frame, depending on whether the acceleration data indicate an amount of acceleration greater than, equal to, or less than a threshold.

Example 14 may be example 13, wherein employing a different search strategy comprises employing a search strategy that searches a quadrilateral area to locate the object in the second image frame, on determination that the acceleration data indicate an amount of acceleration greater than or equal to the threshold.

Example 15 may be example 14, wherein searching the quadrilateral area comprises first searching for the object in a portion of the quadrilateral area that spans from a center of the quadrilateral area to an edge of the quadrilateral area in a direction opposite to an acceleration direction indicated by the acceleration data.

Example 16 may be example 15, wherein searching the quadrilateral area further comprises, on failure to locate the object with the first searching, further searching for the object in another portion of the quadrilateral area that spans from the center of the quadrilateral area to an edge of the quadrilateral area in the acceleration direction.

Example 17 may be example 14, 15 or 16, wherein searching a quadrilateral area comprises searching a parallelogram.

Example 18 may be example 17, further comprising determining a width of the parallelogram based at least in part on the amount of acceleration, and a frame rate of the plurality of image frames.

Example 19 may be any one of examples 13-18, wherein employing a different search strategy comprises employing a search strategy that searches a circular area to locate the object in the second image frame, on determination that the acceleration data indicate an amount of acceleration less than a threshold.

Example 20 may be example 19, further comprises determining a diameter of the circular area based at least in part on the amount of acceleration, and a frame rate of the plurality of image frames.

Example 21 may be any one of examples 12-20, further comprising generating the plurality of image frames.

Example 22 may be an apparatus for computing, including processing of image frames. The apparatus may include means for measuring acceleration, and means for processing a plurality of image frames. The means for processing a plurality of image frames may include means for tracking an object from one image frame to another image frame, that uses acceleration data output by the means for measuring acceleration to assist in locating the object in an image frame.

Example 23 may be example 22, wherein means for tracking an object includes means for employing a different search strategy to locate the object in an image frame, depending on whether the acceleration data indicate an amount of acceleration greater than, equal to, or less than a threshold.

Example 24 may be example 23, wherein means for employing a different search strategy includes means for searching a quadrilateral area to locate the object in an image frame, on determination that the acceleration data indicate an amount of acceleration greater than or equal to the threshold; and means for searching a circular area to locate the object in an image frame, on determination that the acceleration data indicate an amount of acceleration less than a threshold.

Example 25 may be one or more computer-readable storage medium. The storage medium may comprise a plurality of instructions configured to cause a computing device, in response to execution of the instructions by the computing device, to process a plurality of image frames, including a first and a second of the image frames having an object. Process of the image frames may include tracking of the object in the first and second image frames. Tracking of the object in the first and second image frames may include locating of the object in the second image frame. Locating of the object in the second image frame may include usage of acceleration data that indicates acceleration of the computing device to assist in searching for the object in the second image frame.

Example 26 may be example 25, wherein locating of the object comprises employment of a different search strategy to locate the object in the second image frame, depending on whether the acceleration data indicate an amount of acceleration greater than, equal to, or less than a threshold.

Example 27 may be example 26, wherein employment of a different search strategy comprises employment of a search strategy that searches a quadrilateral area to locate the object in the second image frame, on determination that the acceleration data indicate an amount of acceleration greater than or equal to the threshold.

Example 28 may be example 27, wherein a strategy that searches a quadrilateral area comprises a strategy that first searches for the object in a portion of the quadrilateral area that spans from a center of the quadrilateral area to an edge of the quadrilateral area in a direction opposite to an acceleration direction indicated by the acceleration data.

Example 29 may be example 28, wherein a strategy that searches a quadrilateral area further comprises a strategy that, on failure to locate the object with the first searching, further searches for the object in another portion of the quadrilateral area that spans from the center of the quadrilateral area to an edge of the quadrilateral area in the acceleration direction.

Example 30 may be example 27, 28 or 29, wherein a strategy that searches a quadrilateral area comprises a strategy that searches a parallelogram.

Example 31 may be example 30, wherein the computing device is further caused to determine a width of the parallelogram based at least in part on the amount of acceleration, and a frame rate of the plurality of image frames.

Example 32 may be any one of examples 26-31, wherein employment of a different search strategy comprises employment of a search strategy that searches a circular area to locate the object in the second image frame, on determination that the acceleration data indicate an amount of acceleration less than a threshold.

Example 33 may be example 32, wherein the computing device is further caused to determine a diameter of the circular area based at least in part on the amount of acceleration, and a frame rate of the plurality of image frames.

Example 34 may be any one of examples 26-33, wherein the computing device is further caused to generate the plurality of image frames.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for computing, including processing of image frames, comprising:
   an accelerometer;
   a physical processor coupled with the accelerometer; and
   an image processing engine operated by the physical processor, to process a plurality of image frames, wherein the image processing engine includes an object tracking function to track an object from one image frame to another image frame, and wherein the object tracking function uses acceleration data output by the accelerometer, or derived from data output by the accelerometer, to assist in selecting one of a plurality search strategies, depending on whether the acceleration data indicate an amount of acceleration greater than, equal to, or less than a threshold, to search the object in an image frame, wherein the different search strategies employ search areas of different geometric shapes.

2. The apparatus of claim 1, wherein the object tracking function searches a quadrilateral area to locate the object in an image frame, on determination that the acceleration data indicate an amount of acceleration greater than or equal to a threshold.

3. The apparatus of claim 2, wherein the object tracking function first searches for the object in a portion of the quadrilateral area that spans from a center of the quadrilateral area to an edge of the quadrilateral area in a direction opposite to an acceleration direction indicated by the acceleration data.

4. The apparatus of claim 3, wherein the object tracking function, on failure to locate the object, further searches for the object in another portion of the quadrilateral area that spans from the center of the quadrilateral area to an edge of the quadrilateral area in the acceleration direction.

5. The apparatus of claim 2, wherein the quadrilateral area has a shape of a parallelogram.

6. The apparatus of claim 5, wherein the parallelogram has a width determined based at least in part on the amount of acceleration, and a frame rate of the plurality of image frames.

7. The apparatus of claim 1, wherein the object tracking function searches a circular area to locate the object in an image frame, on determination that the acceleration data indicate an amount of acceleration less than a threshold.

8. The apparatus of claim 7, wherein the circular area has a diameter determined based at least in part on the amount of acceleration, and a frame rate of the plurality of image frames.

9. The apparatus of claim 7, further comprising an image capturing device coupled with the image processing engine, to generate the plurality of image frames.

10. The apparatus of claim 7, wherein the apparatus comprises a smartphone, a computing tablet, a laptop computer, a netbook, an e-reader, or a camera.

11. One or more non-transitory storage medium having a plurality of instructions, in response to execution by a computing device, to cause the computing device to:
  process a plurality of image frames, including a first and a second one of the plurality image frames respectively having an object;
  wherein to process the image frames includes to track the object in the first and second image frames;
  wherein to track the object in the first and second image frames includes to locate the object in the second image frame; and
  wherein to locate the object in the second image frame includes usage of acceleration data that indicates acceleration of the computing device to assist in selecting one of a plurality search strategies, depending on whether the acceleration data indicate an amount of acceleration greater than, equal to, or less than a threshold, to search for the object in the second image frame, wherein the different search strategies employ search areas of different geometric shapes.

12. The storage medium of claim 11, wherein to employ a different search strategy comprises to employ a search strategy that searches a quadrilateral area to locate the object in the second image frame, on determination that the acceleration data indicate an amount of acceleration greater than or equal to the threshold.

13. The storage medium of claim 12, wherein to search the quadrilateral area comprises to first search for the object in a portion of the quadrilateral area that spans from a center of the quadrilateral area to an edge of the quadrilateral area in a direction opposite to an acceleration direction indicated by the acceleration data.

14. The storage medium of claim 13, wherein to search the quadrilateral area further comprises, on failure to locate the object with the first search, to further search for the object in another portion of the quadrilateral area that spans from the center of the quadrilateral area to an edge of the quadrilateral area in the acceleration direction.

15. The storage medium of claim 12, wherein to search a quadrilateral area comprises to search a parallelogram.

16. The storage medium of claim 15, wherein the computing device is further caused to determine a width of the parallelogram based at least in part on the amount of acceleration, and a frame rate of the plurality of image frames.

17. The storage medium of claim 11, wherein to employ a different search strategy comprises to employ a search strategy that searches a circular area to locate the object in the second image frame, on determination that the acceleration data indicate an amount of acceleration less than a threshold.

18. The storage medium of claim 17, the computing device is further caused to determine a diameter of the circular area based at least in part on the amount of acceleration, and a frame rate of the plurality of image frames.

19. The storage medium of claim 17, the computing device is further caused to generate the plurality of image frames.

20. A method for computing, including processing of image frames, comprising:
  processing, by a computing device, a plurality of image frames, including a first and a second one of the image frames respectively having an object;
  wherein the processing of a image frames includes tracking the object in the first and second image frames;
  wherein the tracking the object in the first and second image frames include locating the object in the second image frame; and
  wherein the locating the object in the second image frame includes using acceleration data that indicates acceleration of the computing device to assist in selecting one of a plurality search strategies, depending on whether the acceleration data indicate an amount of acceleration greater than, equal to, or less than a threshold, to search for the object in the second image frame, wherein the different search strategies employ search areas of different geometric shapes.

21. The method of claim 20, wherein to employ a different search strategy comprises to employ a search strategy that searches a quadrilateral area to locate the object in the second image frame, on determination that the acceleration data indicate an amount of acceleration greater than or equal to the threshold; or to employ a search strategy that searches a circular area to locate the object in the second image frame, on determination that the acceleration data indicate an amount of acceleration less than a threshold.

* * * * *